(12) United States Patent
Shimizu

(10) Patent No.: US 7,864,378 B2
(45) Date of Patent: Jan. 4, 2011

(54) IMAGE READER

(75) Inventor: Hiromitsu Shimizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 989 days.

(21) Appl. No.: 11/494,573

(22) Filed: Jul. 28, 2006

(65) Prior Publication Data

US 2007/0024923 A1    Feb. 1, 2007

(30) Foreign Application Priority Data

Jul. 29, 2005 (JP) ............................. 2005-221202
Nov. 25, 2005 (JP) ............................. 2005-340594

(51) Int. Cl.
*H04N 1/04* (2006.01)

(52) U.S. Cl. ...................... 358/474; 358/509; 358/475; 382/274; 382/275; 399/364

(58) Field of Classification Search ................. 358/1.2, 358/1.9, 505, 509, 475, 520, 446, 449, 474, 358/486, 497, 471; 382/274, 275, 291; 399/364, 399/367, 371, 374
See application file for complete search history.

(56) References Cited

U.S. PATENT DOCUMENTS

| | | | | |
|---|---|---|---|---|
| 5,086,486 | A * | 2/1992 | Yamada | 382/291 |
| 5,678,156 | A * | 10/1997 | Lee | 399/376 |
| 6,341,019 | B1 * | 1/2002 | Ohta | 358/1.9 |
| 6,891,647 | B2 * | 5/2005 | Konno | 358/497 |
| 7,027,194 | B2 * | 4/2006 | Kanda | 358/496 |
| 7,283,285 | B2 * | 10/2007 | Konno | 358/497 |
| 7,330,692 | B2 * | 2/2008 | Kohchi et al. | 399/376 |
| 7,336,393 | B2 * | 2/2008 | Tsutsumi | 358/1.9 |
| 7,496,326 | B2 * | 2/2009 | Kawabata | 399/399 |
| 7,510,263 | B2 * | 3/2009 | Sakakitani | 347/29 |
| 2004/0190089 | A1 * | 9/2004 | Tsutsumi | 358/505 |
| 2005/0002710 | A1 * | 1/2005 | Ishikura et al. | 399/367 |
| 2005/0023743 | A1 * | 2/2005 | Fujii et al. | 271/3.14 |
| 2005/0128536 | A1 * | 6/2005 | Yamanaka et al. | 358/488 |
| 2006/0050329 | A1 * | 3/2006 | Yokota | 358/474 |

(Continued)

FOREIGN PATENT DOCUMENTS

JP          63-215156          9/1988

(Continued)

OTHER PUBLICATIONS

Japanese Office Action dated Aug. 17, 2010, issued in corresponding Application No. JP 2005-340594.

*Primary Examiner*—Negussie Worku
(74) *Attorney, Agent, or Firm*—Harness, Dickey & Pierce, P.L.C.

(57) ABSTRACT

An image reader includes a lamp that irradiates light onto a document, a first carriage that moves the lamp along the document to optically scan the document, a CCD that receives light reflected from the document and prepares an image data indicative of an image of the document. A size sensor detects a length of the document in an auxiliary scanning direction, and an IPU that detects a length of the document in the main scanning direction from the image data. A CPU monitors whether a size of the document has changed, based on the detected by the size sensor, and controls irradiation of the light by the lamp based on the result of monitoring.

10 Claims, 17 Drawing Sheets

U.S. PATENT DOCUMENTS

2008/0198425 A1* 8/2008 Ozaki et al. .................. 358/475
2010/0157385 A1* 6/2010 Fukasawa .................... 358/474

FOREIGN PATENT DOCUMENTS

| | | |
|---|---|---|
| JP | 02-109462 | 4/1990 |
| JP | 03-204266 | 9/1991 |
| JP | 04-362858 | 12/1992 |
| JP | 06-205173 | 7/1994 |
| JP | 10-200703 | 7/1998 |
| JP | 10-254074 | 9/1998 |
| JP | 10-257255 | 9/1998 |
| JP | 11-205546 | 7/1999 |
| JP | 11-355520 | 12/1999 |
| JP | 2000-092278 | 3/2000 |
| JP | 2000-138798 | 5/2000 |
| JP | 2000-287037 | 10/2000 |
| JP | 2001-016406 | 1/2001 |
| JP | 2001-285581 | 10/2001 |
| JP | 2003-198809 | 7/2003 |
| JP | 2003-250028 | 9/2003 |
| JP | 2004-170655 | 6/2004 |

* cited by examiner

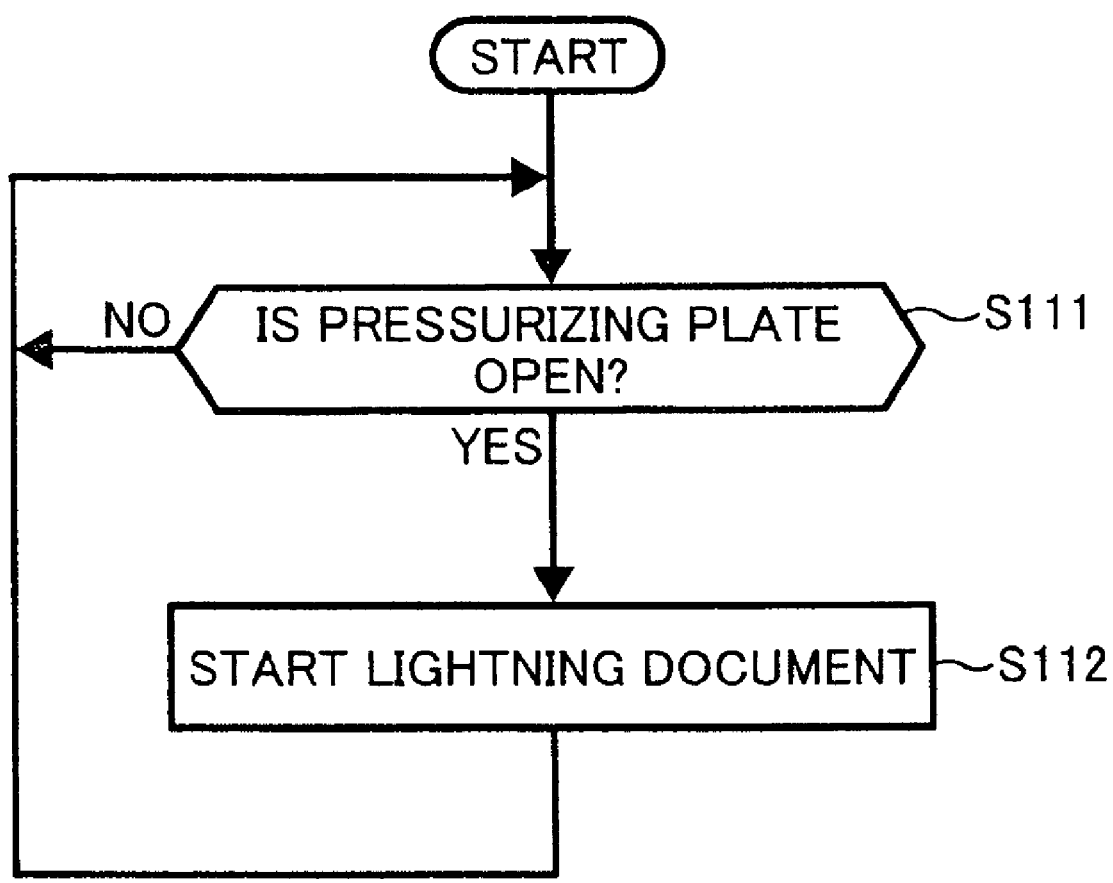

IMAGE READER

CROSS-REFERENCE TO RELATED APPLICATIONS

The present document incorporates by reference the entire contents of Japanese priority documents, 2005-221202 filed in Japan on Jul. 29, 2005 and 2005-340594 filed in Japan on Nov. 25, 2005.

BACKGROUND OF THE INVENTION

1. Field of the Invention

The present invention relates to an image reader used in an image-forming device such as a digital copy machine and a multifunction device.

2. Description of the Related Art

Some document readers employ an infrared ray sensor as a means for detecting a document size when the document is book-shaped. Other document readers use a line sensor for reading a document instead of the infrared ray sensor. To detect size of a document, it is necessary to obtain the lengths of the document in two directions, namely the length in the main scanning direction and the length in the auxiliary scanning direction. For detecting the length in the auxiliary scanning direction, when a line sensor is used to read the document, it is necessary to pre-scan the document in the auxiliary scanning direction. Because time is spent in scanning for acquiring the length in the auxiliary scanning direction, as the efficiency of the overall scanning operation degrades. To evade this, one approach is to use a line sensor for detecting the length in the main scanning direction and use an infrared ray sensor for detecting the length in the auxiliary scanning direction. Conventional document readers have been disclosed, for example, in Japanese Patent Laid-Open Nos. H10-257255, 2000-138798, and 2003-198809.

Japanese Patent Laid-Open No. H10-257255 (Patent Document 1), Japanese Patent Laid-Open No. 2000-138798 (Patent Document 2), and Japanese Patent Laid-Open No. 2003-198809 (Patent Document 3) disclose systems in which the length in the main scanning direction is detected on the assumption that the document is white and the area surrounding the document is black when a pressurizing plate that presses the document so that the document does not move is open.

In the Patent Document 2, the lengths are detected two times, once with a lamp that irradiates light on the document with the lamp ON, and a second time with the lamp OFF. This configuration is employed for eliminating effects of ambient light. In the Patent Document 3, the line sensor detects the document at two or more read positions in the main scanning direction to detect the length of document in the main scanning direction.

Although the systems disclosed the Patent Documents 1 and 2 are accurate, they systems are not effective in that a period of time until the pressurizing plate is closed can not be shortened. In the system disclosed in the Patent Document 3, whether the lamp is ON or OFF is not taken into consideration when detecting the lengths, in other words, lengths obtained the lamp is ON or OFF are simply averaged, so that there is a possibility that the lengths are not accurately detected.

SUMMARY OF THE INVENTION

It is an object of the present invention to at least partially solve the problems in the conventional technology.

According to an aspect of the present invention, an image reader includes a lighting unit that irradiates light onto a document set at a document read position; a scanning unit that moves the lighting unit along the document to optically scan the document and acquire an optical signal indicative of an image of the document; an image reading unit that receives the optical signal from the scanning unit and prepares an entire image of the document; and a control unit that monitors changes in setting position of the document and controls irradiation of the light by the lighting unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 17 is a flowchart of operations performed by an image reader according to a second embodiment of the present invention;

DETAILED DESCRIPTION OF THE PREFERRED EMBODIMENTS

Exemplary embodiments of the present invention are described below with reference to the accompanying drawings.

The embodiments of the present invention provides an image reader capable of stabilizing an intensity of light in short time, shortening a period of time necessary to detect a document size, and preventing misdetection due to lack of light from a lamp by setting a document lighting unit to start lighting before detecting the document size in the main scanning direction, when scanning a book-shaped document set on a contact glass with a pressurizing plate or an automatic document feeder (ADF) being open.

Figure 1:
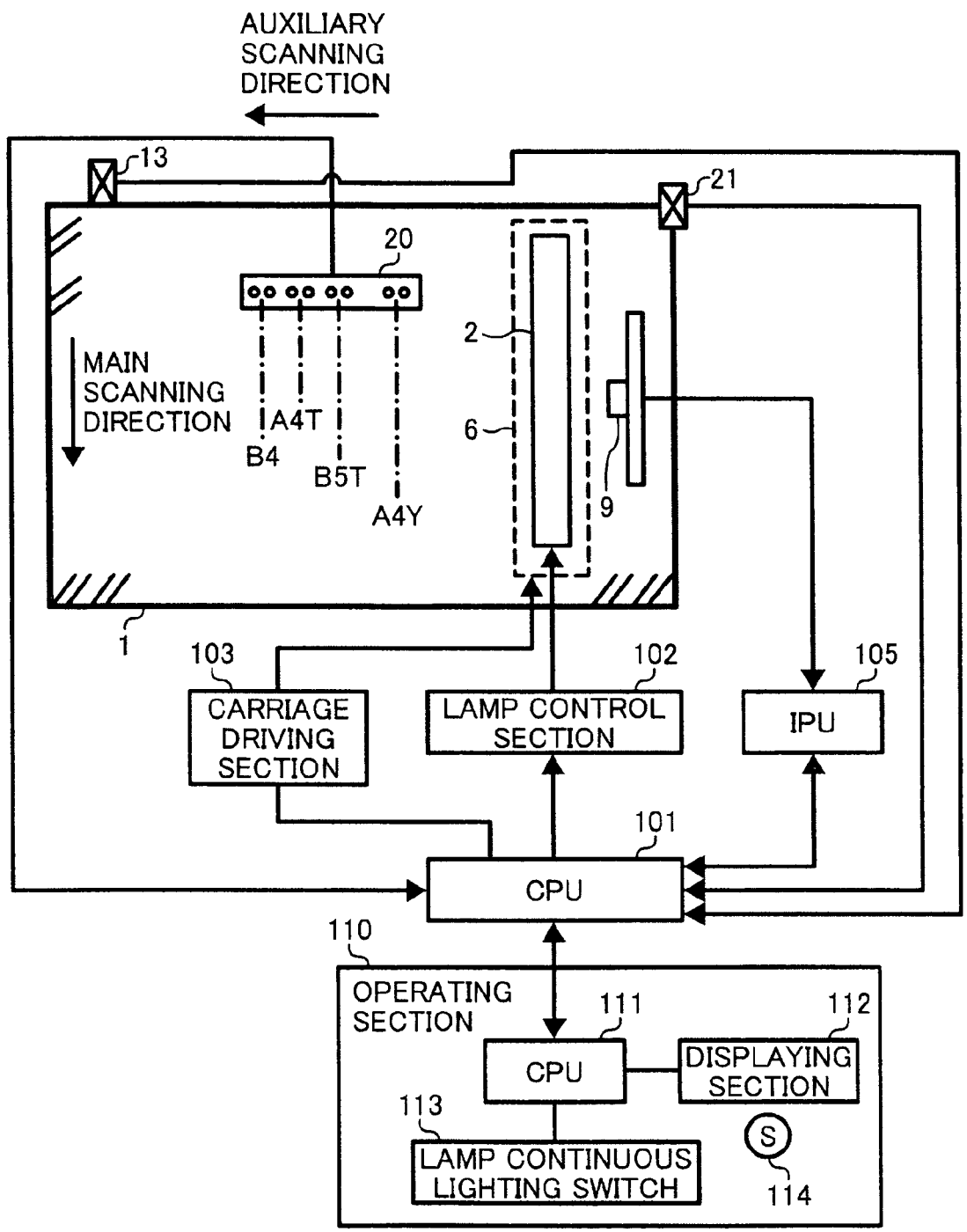
FIG. 1 is a block diagram of relevant portions of an image reader according to a first embodiment of the present invention.

FIG. 1 is a block diagram of relevant portions of an image reader according to a first embodiment of the present invention. In FIG. 1, reference numeral 1 denotes a contact glass with the book-shaped document set thereon; 2 a lamp for lighting the contact glass 1; 9 a charged coupled device (CCD), which is a line sensor, for reading an optical image; 13 a home-position sensor for detecting a prespecified position of a carriage; 20 a size sensor for detecting two or more lengths of the document in the auxiliary scanning direction with a reflective infrared ray sensor; 21 a pressurizing plate open/closed sensor for detecting whether a pressurizing plate or an ADF (not shown) is open or closed; 101 a CPU for controlling the image reader as a whole; 102 a lamp control section for turning ON/OFF the lamp 2; 103 a carriage driving section; 105 an image processing unit (IPU) for processing an image data to be read; 110 an operating section having a switch or the like for a user to perform prespecified setting instruction therewith and also for displaying a state of the device; 111 a CPU for controlling the operating section 110; 112 a displaying section for displaying a set state or an operating state of the device; 113 a lamp continuous lighting switch for the user to make the lamp continuously light irrespective of a change in the document state; 114 a start key to be pressed when the operation for reading starts; and 6 a first carriage. Details of the components are described below. An external device such as a personal computer connected to the image reader may function as the lamp continuous lighting switch 113.

Figure 2:
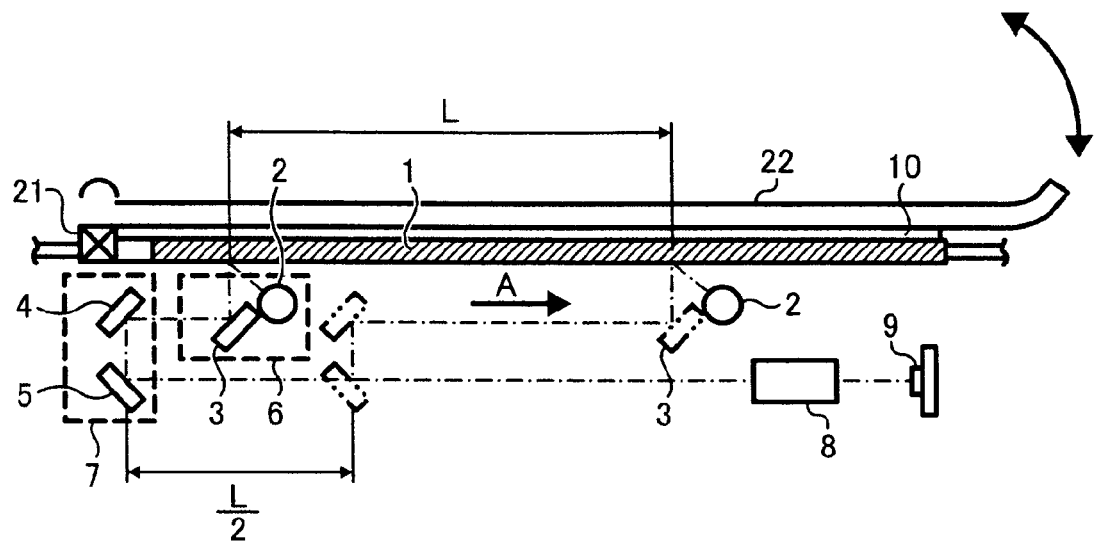
FIG. 2 is a side view of relevant portions of the image reader shown in FIG. 1.

FIG. 2 is a side view of relevant portions of the image reader shown in FIG. 1. The image reader irradiates light on a document 10 set on the contact glass 1 with the lamp 2 and focuses light reflected by a first mirror 3, a second mirror 4, and a third mirror 5 on the CCD 9 with a lens 8. In a period of time when the lamp 2 and the first mirror 3 moves over a distance of L, the second mirror 4 and the third mirror 5 moves over a distance of L/2. Thereby, the document is fully scanned with a light path of the optical system kept at a constant length. The reference numeral 21 denotes the pressurizing plate open/closed sensor for detecting whether a pressurizing plate 22 (or the ADF) is open or closed; and 22 the pressurizing plate for pressing the document 10 onto the contact glass 1.

Figure 3:
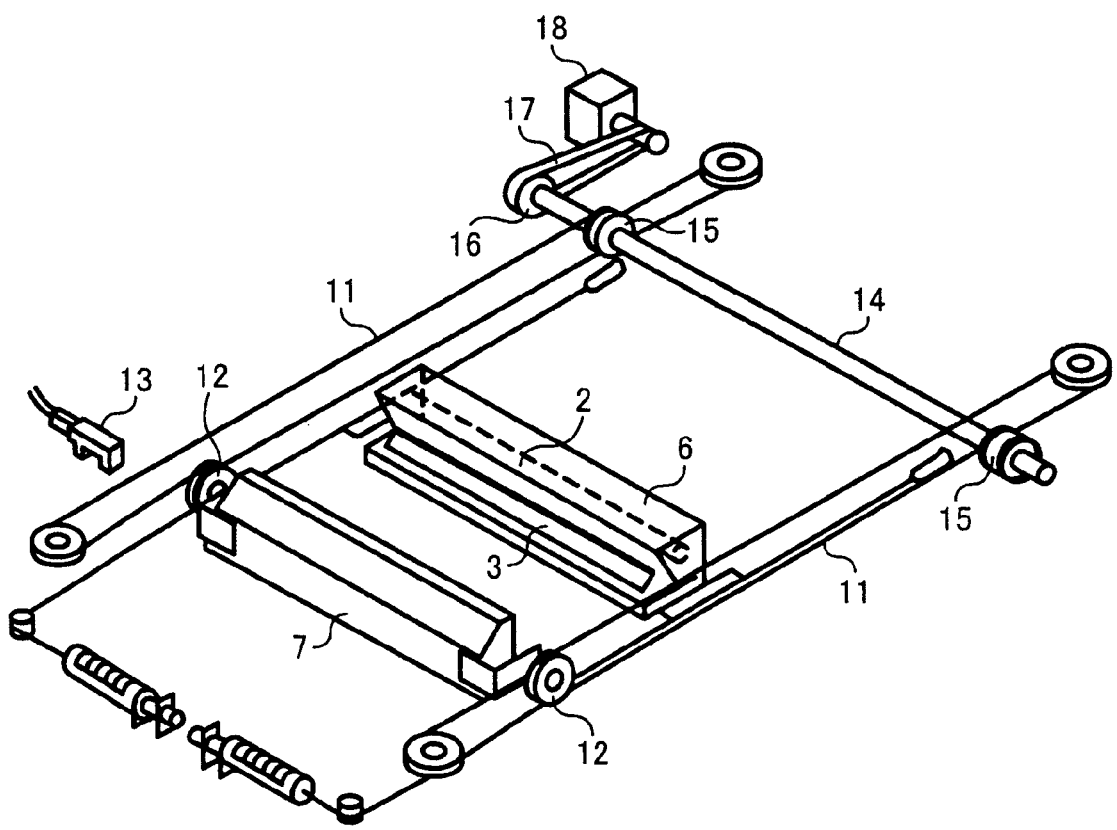
FIG. 3 is a perspective view of mechanical parts of the image reader shown in FIG. 2.

FIG. 3 is a perspective view of mechanical parts of the image reader shown in FIG. 2. The first carriage 6 having the lamp 2 and the first mirror 3 is disposed on a driving wire 11; and the driving wire 11 of a second carriage 7 having the second mirror 4 and the third mirror 5 is wound around a pulley 12. The driving wire 11 is wound around a wire pulley 15 linked to a driving shaft 14. A driving force generated from a motor 18 is delivered through a timing pulley 16 and a timing belt 17. A home position is set at a position where an end of the first carriage 6 returns by a certain distance after crossing the home-position sensor 13.

Figure 4:
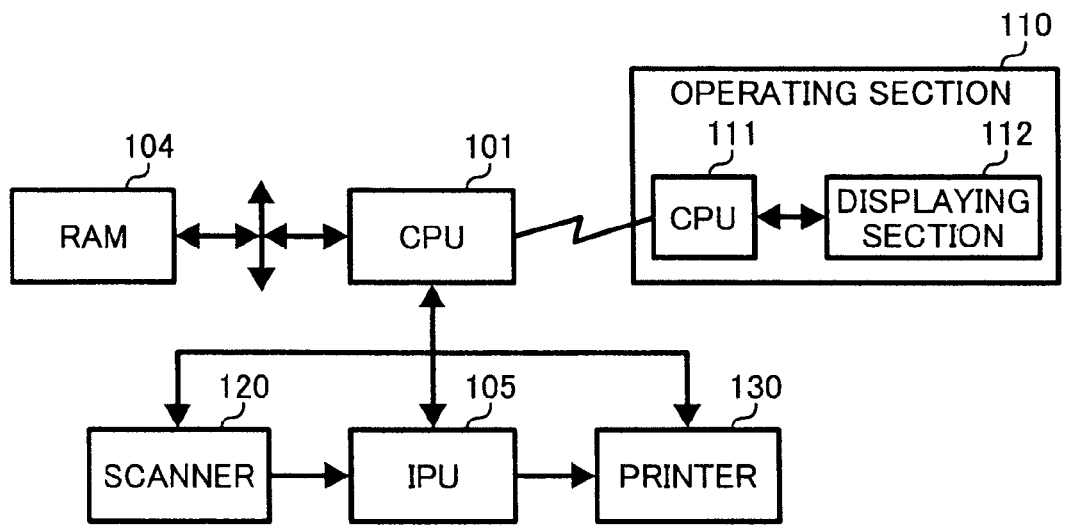
FIG. 4 is a block diagram of a digital copy machine (multifunction product) that is coupled to the image reader shown in FIG. 1.

FIG. 4 is a block diagram of a digital copy machine (multifunction product) that is coupled to the image reader. When the document is set on a scanner 120 and the start key 114 (Refer to FIG. 1) is pressed, the scanner 120 scans the document, the IPU 105 performs a series of operations for processing the image, a printer 130 outputs the image data and feeds out a sheet of paper. Parameters necessary to operate the scanner 120, the IPU 105, and the printer 130 are stored in a RAM 104 connected to the CPU 101. The CPU 101 sets parameters for each device. Mode information necessary to set the parameters is specified by the user by using the operating section 110. The CPU 111 in the operating section 110 communicates with the CPU 101 to exchange the information.

Figure 5:
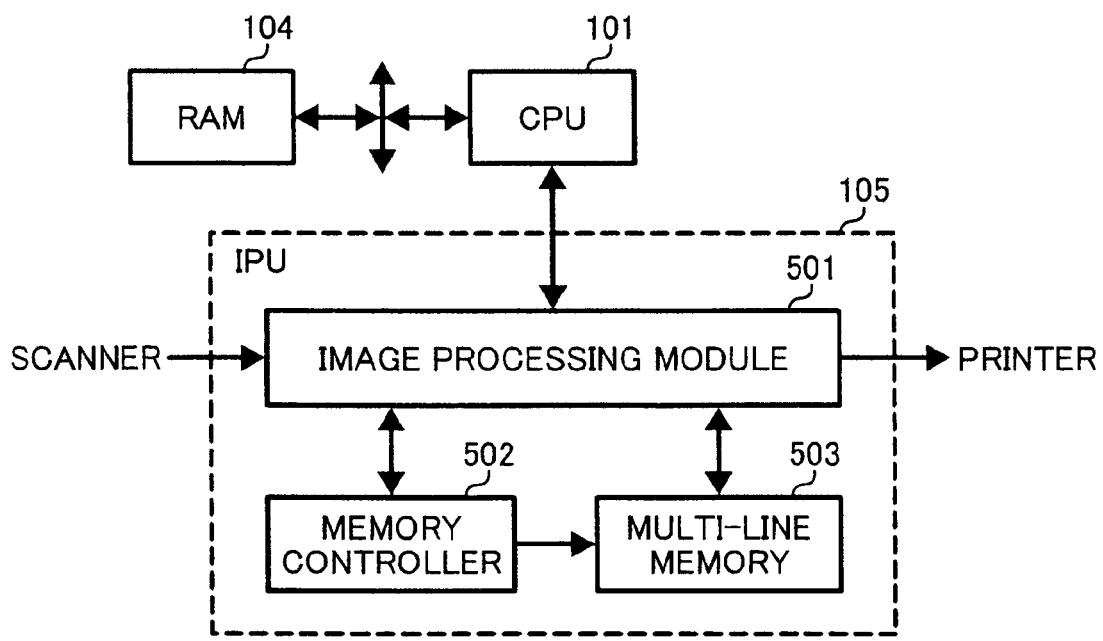
FIG. 5 is a detailed block diagram of an IPU shown in FIG. 4.

FIG. 5 is a detailed block diagram of the IPU 105. The IPU 105 performs an intended image processing over the data which the scanner 120 scans and sends to the IPU 105. When an operation for detecting the document size is performed, the image data is stored in a multi-line memory 503 connected to an image processing module 501. The IPU 105 includes a memory controller 502 for controlling the multi-line memory 503, which enables the CPU 101 to read and write data from or in the multi-line memory 503.

Figure 6:
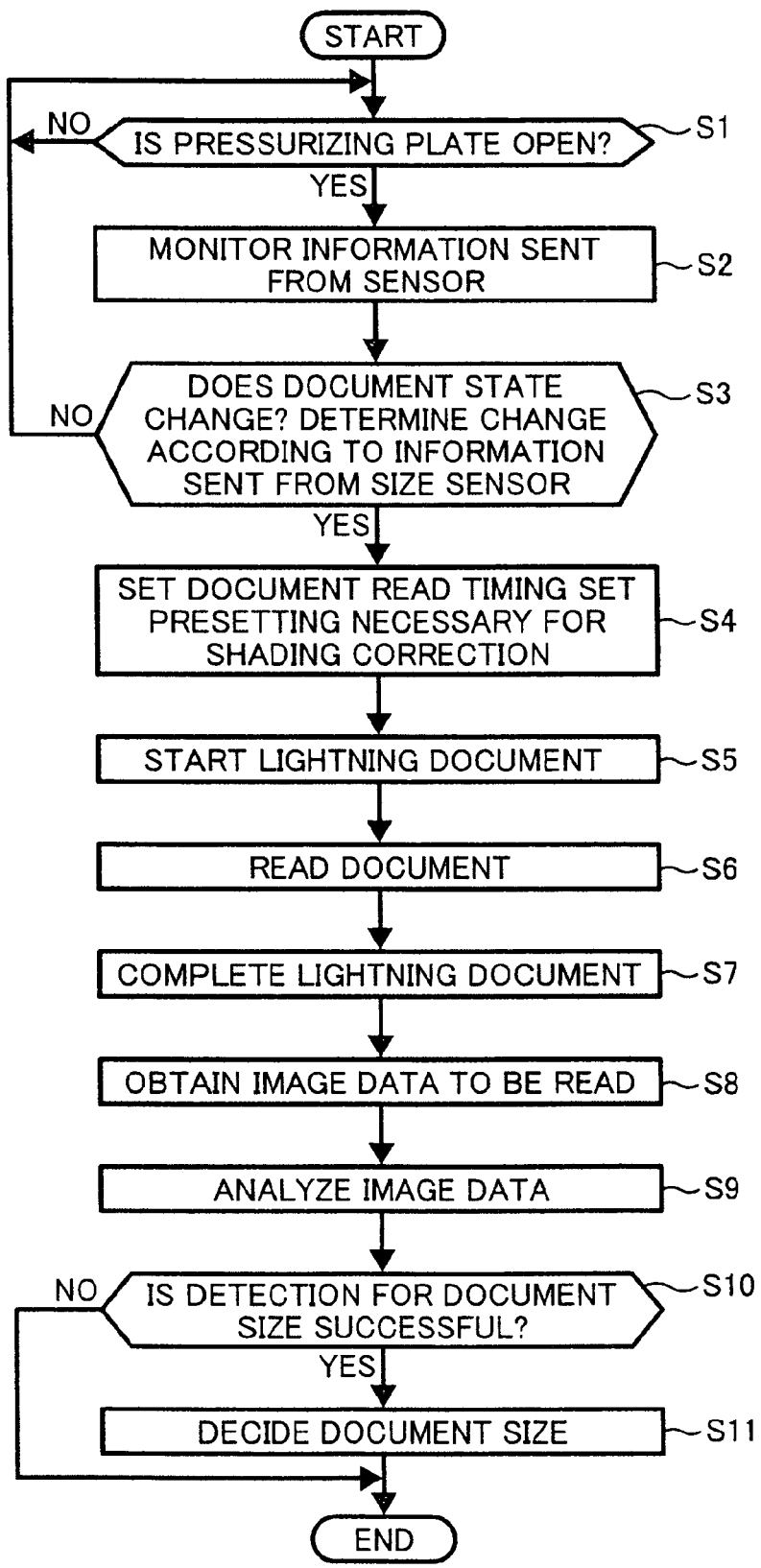
FIG. 6 is a flowchart of an operation for detecting size of a document performed by the image reader shown in FIG. 1.

FIG. 6 is a flowchart of an operation for detecting size of a document performed by the image reader shown in FIG. 1. The CPU 101 controls the operations for detecting the document size via the IPU 105. First, whether the pressurizing plate 22 or the ADF is open or closed is determined based a signal output from the pressurizing plate open/closed sensor 21 (step S1). When it is determined that the pressurizing plate 22 is open, the CPU 101 monitors information sent from the size sensor (step S2) to determine whether a change in the document state has occurred (step S3). When it is determined that the document state has changed, the CPU 101 sets a document read timing and makes necessary setting for shading (optical distortion) correction (step S4).

Practically, the CPU 101 starts the operation for detecting the document size when the CPU 101 detects that the first carriage 6 (hereinafter, "carriage", because among carriages, the only moving carriage is the first carriage 6) is at the document size detecting position and the pressurizing plate 22 is closed or when the user presses the start key 114. Whether the pressurizing plate 22 is open or closed is detected by checking whether the pressurizing plate open/closed sensor 21 is ON or OFF. When the operation for detecting the document size starts, preparations necessary for detecting the document size are performed first. The CPU 101 also sets the document read timing for detecting the document size shown in FIGS. 7 and 8 and, if necessary, makes the presetting for shading correction.

After the preparations described above are completed, the CPU 101 starts lighting the document (step S5), reads the document (step S6), finishes lighting the document (step S7), and obtains image data from the document to be read (step S8). Then, the CPU 101 analyzes the image data (step S9), determines whether the document size is successfully detected (step S10), and, when the detection is successful, decides the document size (step S11).

The steps S2 to S5 can be performed in sequence or in parallel.

For instance, when the preparation for detecting the document size and the process for starting lighting the document are completed, the CPU 101 can start reading the document. The reading process is completed after generating a write signal suitable for the document size and reading the image data within an effective range of the write signal. In the reading process, the reading operation is performed as scanning the document with the carriage moving or as obtaining two or more lines of image data to be read in a state that the carriage keeps at the document size detecting position. When scanning the document with the carriage moving, the CPU 101 can read images each positioning at a different part on the document, so that a possibility of miss-detecting the document size decreases. Besides, the carriage moves to the original document read position while reading the document, so that a period of time during the document read process for the main scanning is shorten. When scanning the document with the carriage kept at the document size detecting position, the CPU 101 can clearly detect an effect from ambient lights on a platen and a change in a state of lighting of the document lighting lamp based from the image data (The detection described above may be possible when scanning the document with the carriage moving). When the operation for reading the document is completed, the CPU 101 finishes lighting the document.

When the main scanning is started right after the operation for detecting the document size is completed, the document lighting lamp may keep lighting instead of performing the process for lighting the document. In FIG. 6 a process for determining to perform the main scan is omitted. There is no specific limitation concerning the order between the process for lighting the document and a process for obtaining the image data described below, and the processes may performed in parallel. After reading the document, an image data of the document, which is scanned for analyzing the document size, is obtained. In the embodiment to obtain the image data of the document, the CPU 101 shown in FIG. 5 reads the data stored in the multi-line memory 503. The CPU 101 analyzes the image data to be obtained and determines the document size. The details of the analyzing process are described below. When determination of the document size is successful, the CPU 101 decides the document size.

To decide the document size practically represents storing information on the document size in the RAM 104 connected to the CPU 101 shown in FIG. 5 for performing programs. In subsequent processes, the information concerning the document size to be decided is read out when necessary. The operation for detecting the document size is completed after the document size is decided. When the determination of the document size fails, the operation for detecting the document size is completed in a state that the document size is not decided. The fail cases for the determination of the document size may be listed such as the document is entirely black, or because of the problem concerning lightning for instance an effect from ambient lights on the platen and insufficient lighting by the document lighting lamp (such as unstable lighting by the lamp 2) the document size can not be determined based on the data to be read. The basic sequence of operation for detecting the document size is described above.

Figure 9:
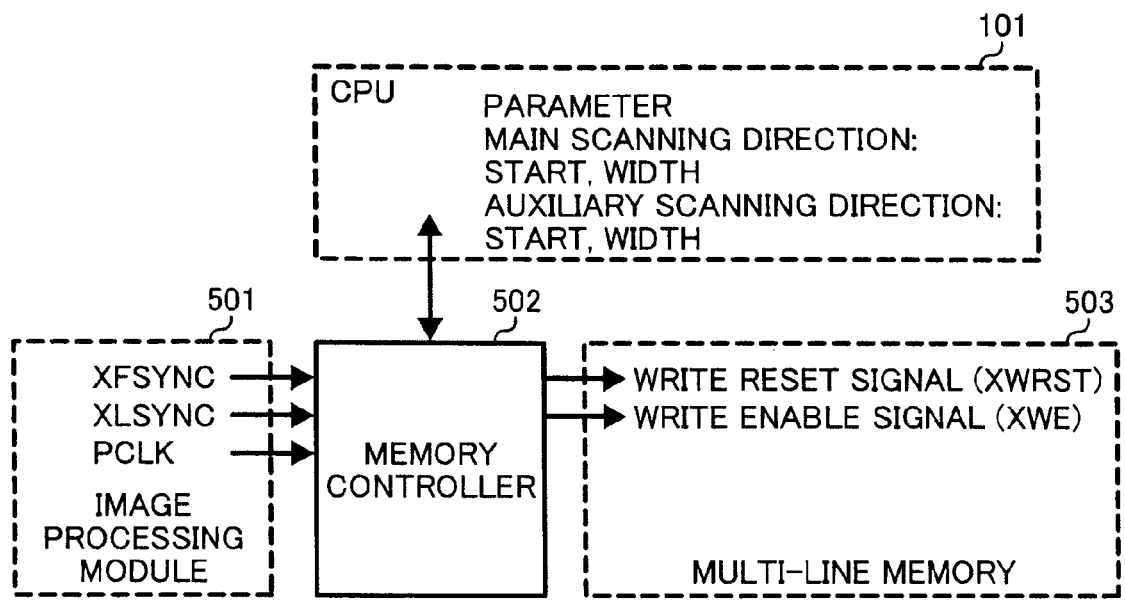
FIG. 9 is a schematic for explaining the signals input into and output from a memory controller shown in FIG. 5.

Next, the analyzing process of image data of the document (determining the document size) is described below in details. FIG. 9 is an example of the memory controller 502. The memory controller 502 receives from the image processing module 501 an XLSYNC signal as a criterion of a read position line for the line sensor (the CCD 9), a PCLK as a pixel clock, an XFSYNC signal for representing a trigger for the line sensor to start reading, and sends the write reset signal (XWRST signal) and the write enable signal (the XWE signal) to the multi-line memory 503. The memory controller 502 also receives four parameters of main scanning start, main scanning width, auxiliary scanning start, and auxiliary scanning width, each representing a memory write region and identifies a write position on the memory (the RAM 104) based from two criteria signals of the XFSYNC and the XLSYNC.

Figure 7:
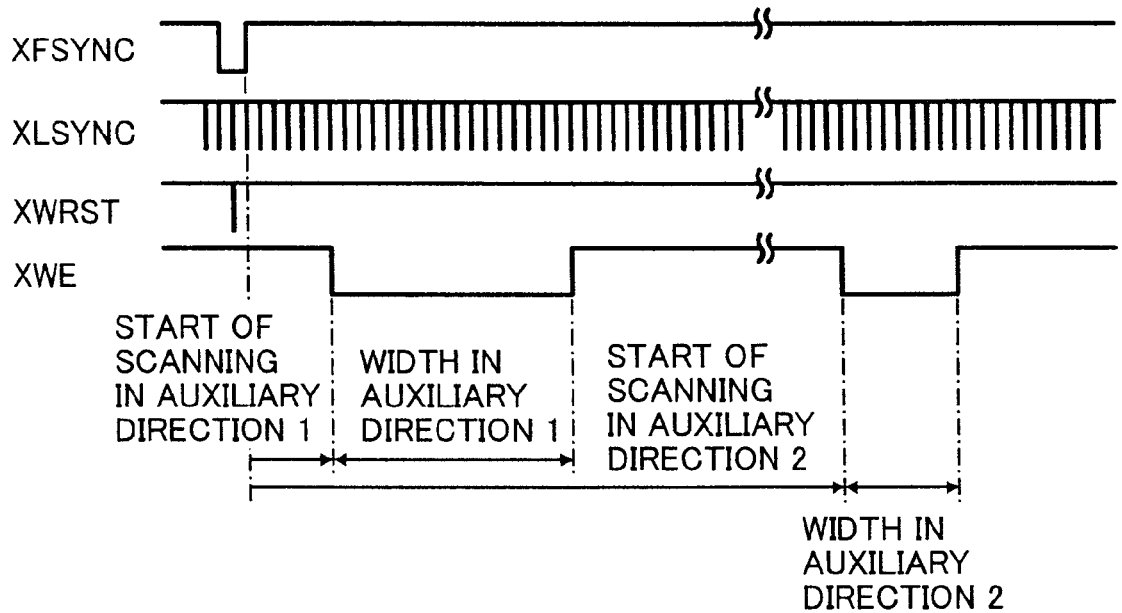
FIG. 7 is a timing chart of an operation for detecting the length of the document in the auxiliary scanning direction.
Figure 8:
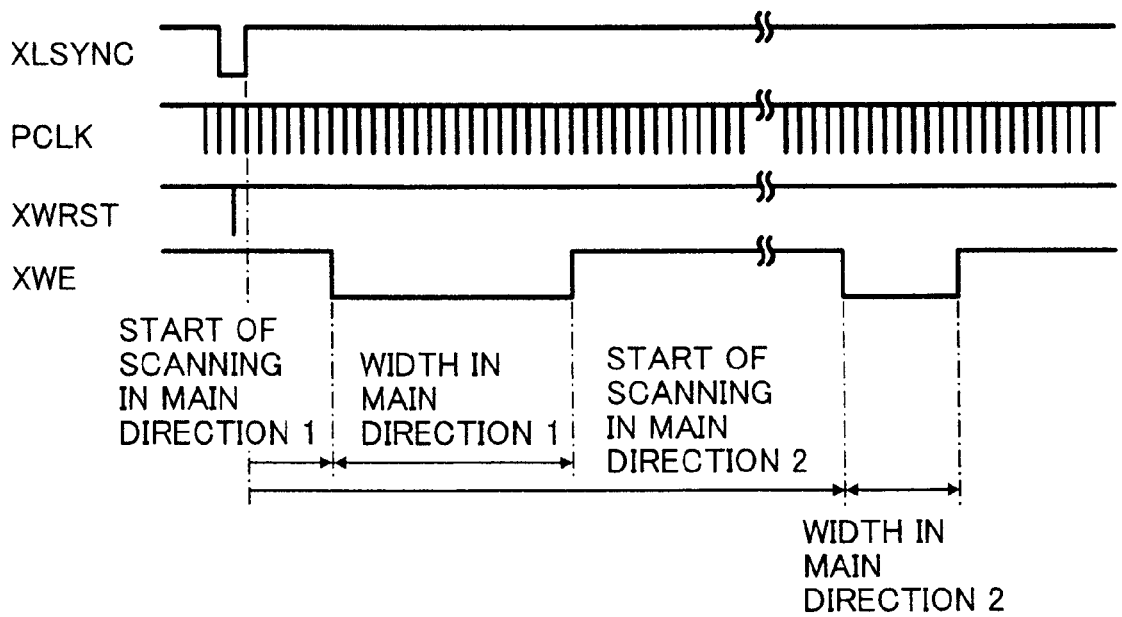
FIG. 8 is a timing chart of an operation for detecting the length of the document in the main scanning direction.
Figure 10:
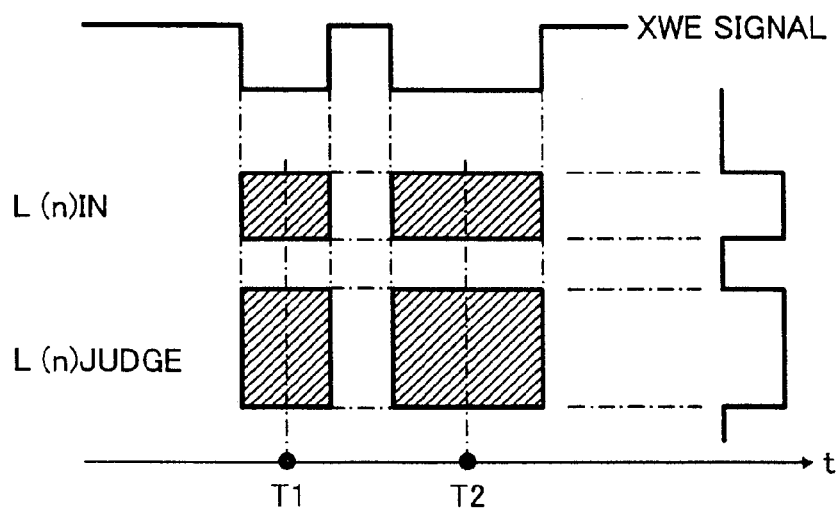
FIG. 10 is a schematic for explaining a black/white determining process.

FIG. 7 is a timing chart of an operation for detecting the length of the document in the auxiliary scanning direction, and FIG. 8 is a timing chart of an operation for detecting the length of the document in the main scanning direction. The memory controller 502 is configured described above so that the memory controller 502 can simultaneously write on the memory (the RAM 104) a plurality of patch data in the two-dimensional direction shown in FIG. 10. A shaded area represents a memory write area. In the descriptions above, parameters and timing are defined in relation to the main scanning direction and the auxiliary direction, and the expression of "auxiliary scanning direction" as used herein means not only a scanning direction against a document, but also passage of time. In FIG. 10, the horizontal axis t represents passage of time, and each of T1 and T2 denotes a read patch position.

Figure 11:
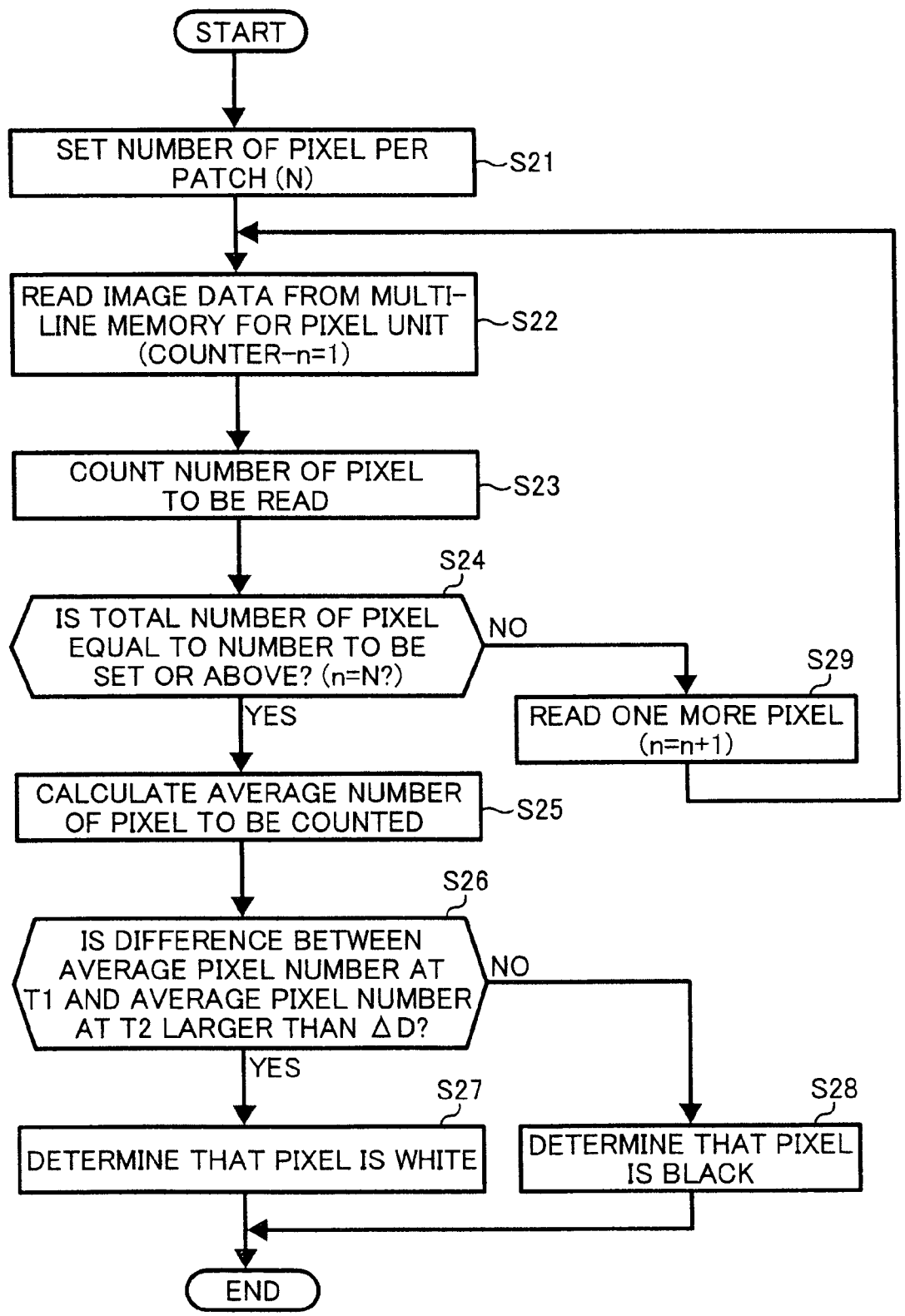
FIG. 11 is a flowchart of a process for obtaining an image data.

Next, an example of obtaining the image data is described with reference to a flowchart shown in FIG. 11. In the example, whether a patch is black or white is determined by reading each of the patch data shown in FIG. 10 from the multi-line memory 503 on the RAM 104 connected to the CPU 101, calculating an average value of the patches and performing a binary process. The process starts by setting of a number of pixels per patch (step S21). After that, the patch is read from the multi-line memory 503 for each pixel unit, and the number of pixels to be set (N pixel) is counted (steps S22 and S23). Then whether the total number of pixels is equal to or more than the number of pixels to be set is determined (step S24). When the number of pixels is less than the number to be set, one more pixel is read (step S29).

When it is determined at step S24 that the total number is equal to or more than the number to be set, an average value in the patch is calculated (step S25), and the patch is converted to binary values (step S26). Determination of the white and black pixels of the patch is performed based on the result (steps S27 and S28).

In the method described above, an operation for obtaining an average is performed after all of N pixels are added. Another method can be employed in which, for instance, an average value for the main scanning direction is calculated.

Figure 12:
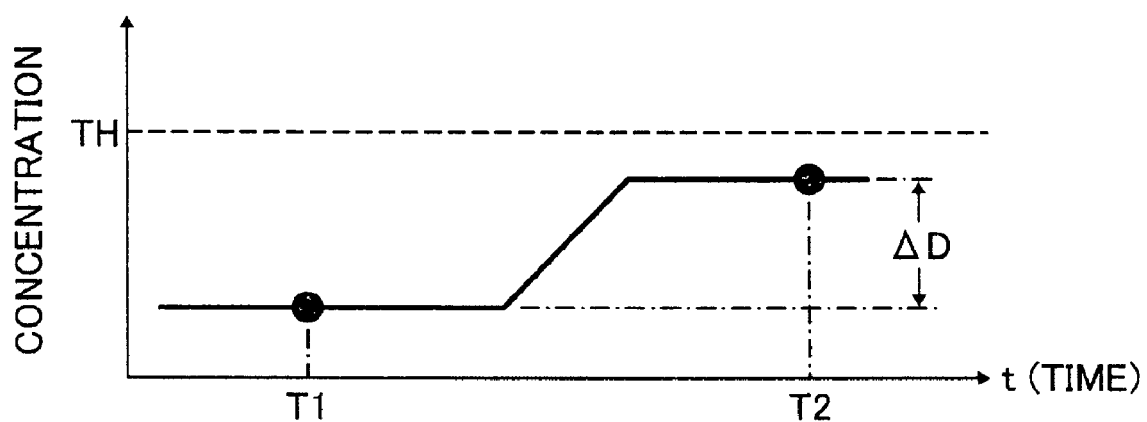
FIG. 12 is a graph for explaining the step S26 shown in FIG. 10.

FIG. 12 is a graph for explaining the step S26 shown in FIG. 10. The basic algorithm is based on the fact that, when the pressurizing plate 22 is open, no light reflection occurs on a white portion of the document and an area outside the document. In the case as shown in FIG. 12, the image reader determines that the document is present at portions where brightness of reflected light is higher than a threshold value (TH) and that the document is not present at portions where brightness is lower than the threshold value. Therefore, in the case as shown in FIG. 12, when the texture itself is dark, sometimes the reflected light may be darker than the threshold value, and the image reader may determine that there is no document. To prevent the misrecognition as described above, the image reader calculates a difference between PAT1 and PAT2 denoting patches read at time points T1 and T2 respectively, and determines that, when the difference is ΔD or larger, a document is placed even when the value is below the threshold value. The ΔD is additionally set as a parameter provided by the CPU 101 in relation to start and a width in the main scanning direction or start and a width in the auxiliary scanning.

An example for image data analysis is described below with reference to a flowchart shown in FIG. 13. In the following description, L(n)IN and L(n)JUDGE denote reading patches as shown in FIG. 10 respectively. "n" in the L(n)IN denotes how many times reading is performed after the read process by the line sensor (CCD9) starts. Namely, "n" denotes a passage of time. "IN" and "JUDGE" denotes positions in the main scanning direction; "IN" is a main scanning position where the entire document as a target for detection is in a range within the document; and "JUDGE" denotes a main scanning position where a criteria for determination as to whether a document is present or not is changed.

Figure 13:
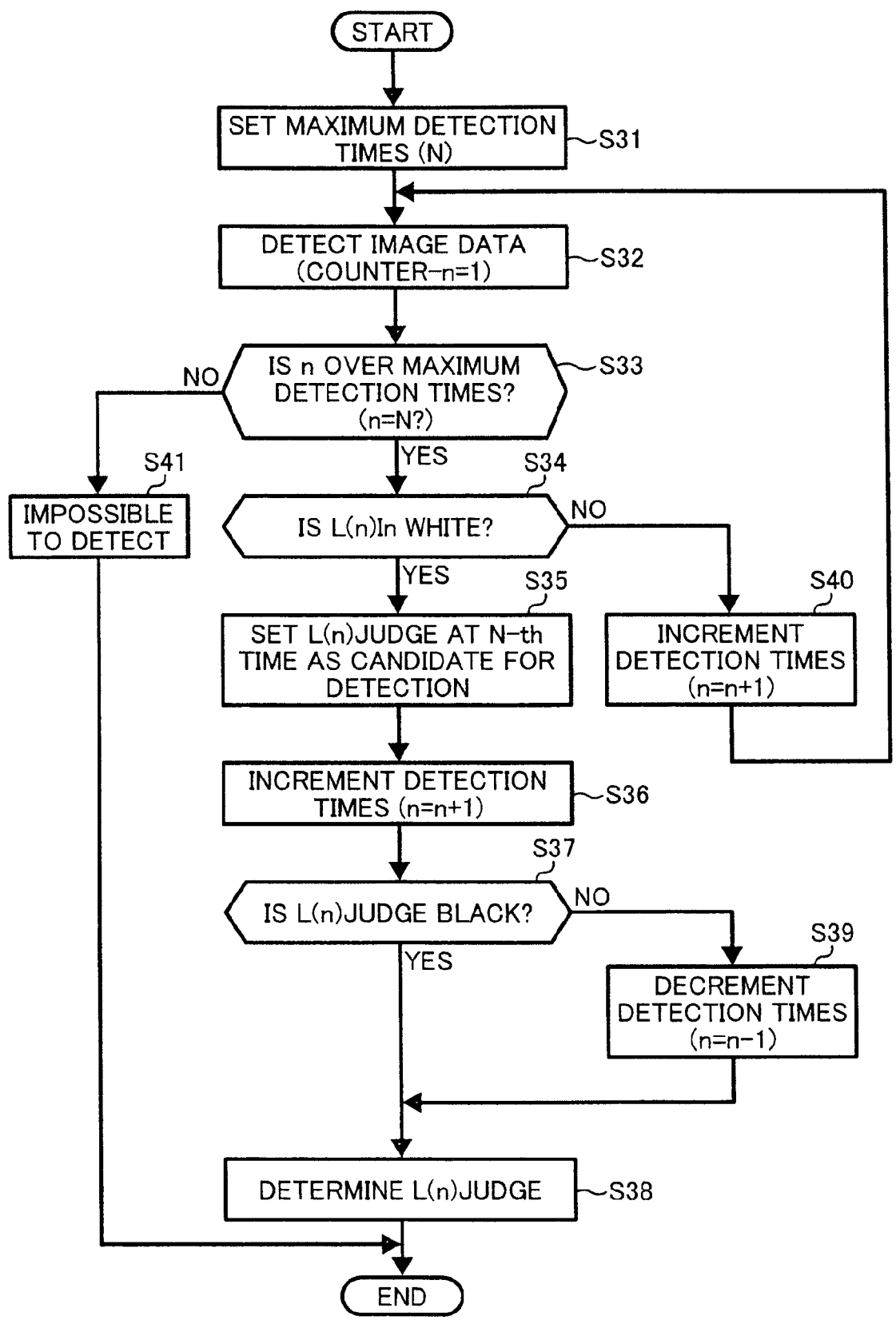
FIG. 13 is a flowchart of a process for analyzing the image data.

In FIG. 13, the process is started by setting the maximum detection times N (step S31). As a default value, n is set at 1 (step S32). Next, it is determined whether n is over the maximum detection times N or not (step S33). When the n is over N, the image reader determines that detection is impossible (step S41), and the process is terminated. When n is not over N at step S33, the process flows to a step for determining whether the L(n)IN (Refer to FIG. 10) is white or not (step S34). When L(n)IN is not white, the detection times n is incremented and the process returns to step S32 (step S40).

When it is determined at step S34 that the L(n)IN is white, the JUDGE (Refer to FIG. 10) at n-th time is set as a candidate for detection (step S35). And then the detection times is incremented (step S36), and the process flows to the next step for determining whether the L(n)JUDGE is black or not (step S37). When the L(n)JUDGE is black, determination for the L(n)JUDGE is performed (step S38). When the L(n)JUDGE is not black, the detection times is decremented (step S39).

Determination for the parameters is repeated until n becomes equal to N. Then whether the L(n)IN is white or not is determined. When also inside of the document is black, the lamp is determined as OFF, the detection time is incremented by 1, and the process returns to step S32. When L(n)IN is white, a candidate for detection is decided based on a result of determination for L(n)JUDGE. Then whether L(n)JUDGE is black or not is determined. When the L(n)JUDGE is white, the possibility that the pressurizing plate 22 is closed is high. In this case judgment is not performed at this step, and the detection process is performed according to a result of previous detection. When the L(n)JUDGE is black, the result of determination at this step is used because it is considered that lighting is more stable as compared to the state in the previous step.

The basic sequence and algorism in the process for detecting size of a document in the embodiment of the present invention is as described above.

Figure 14:
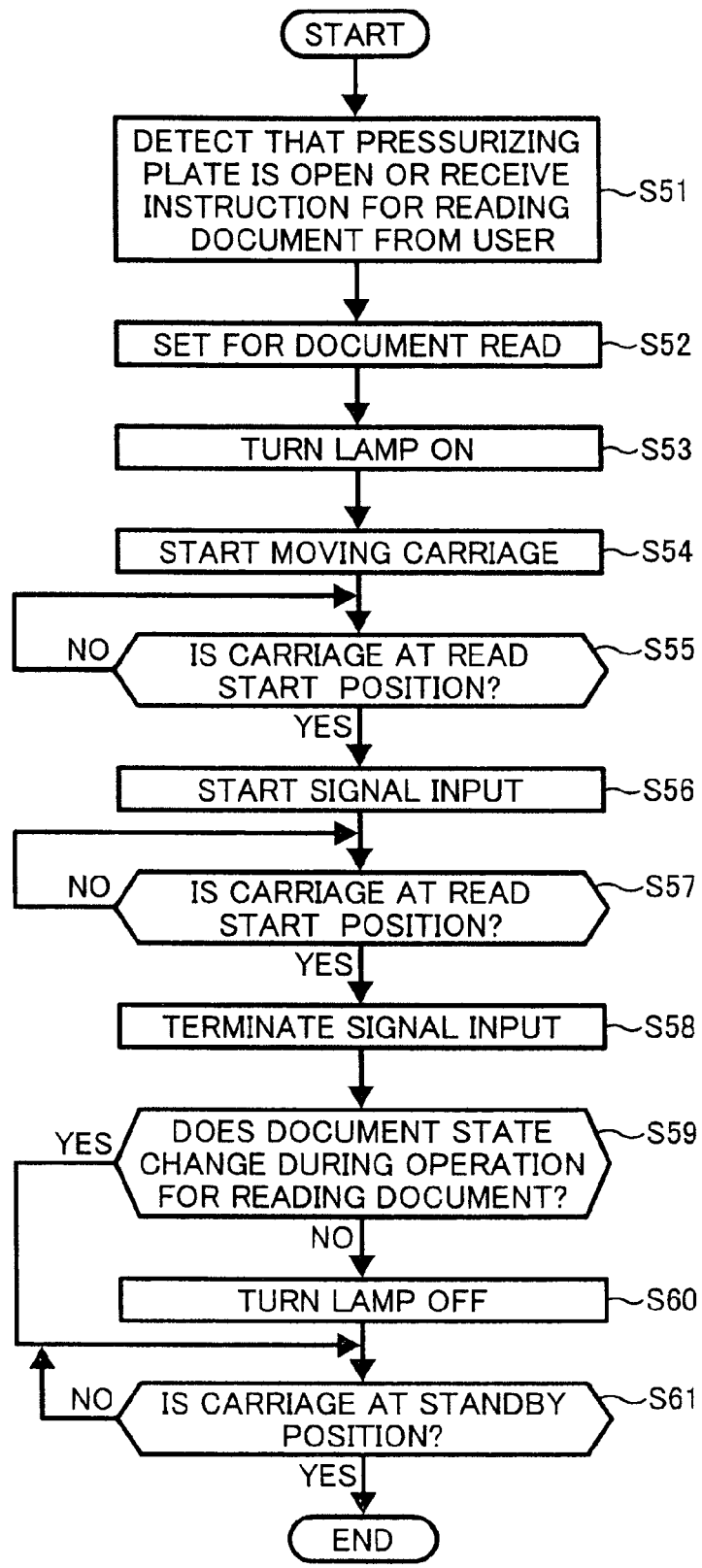
FIG. 14 is a flowchart for explaining an example of actions performed during a document read process.

Based on the basic sequence and algorism concerning detection of the document size, a first example of operations of the embodiment for controlling lighting of the lamp 2 in response to a change in the document state is described below with reference to FIG. 14. To monitor changes in the document state, information sent from the size sensor 20 for detecting a size in the auxiliary direction is used. As shown in FIG. 14, when the pressurizing plate open/closed sensor 21 detects that the pressurizing plate is open, or when the start key 114 provided at the operating section 110 is pressed and an instruction for reading the document is received (step S51) setting for document read is performed (step S52) and the lamp 2 is turned ON (step S53). Next, the carriage starts moving (step S54), and whether the carriage is at the read stating position is determined (step S55). In other words, whether the carriage is at a prespecified position is determined by the home-position sensor 13. When it is determined that the carriage is at the starting position, input of a read signal is started (step S56), and whether the carriage is at the read end position is determined (step S57). When the carriage is at the read end position, the signal input is terminated (step S58). Also, whether the document state has changed during the reading operation is determined (step S59). When the document state has not changed, the lamp 2 is turned OFF (step S60). After turning OFF the lamp 2, whether the carriage is at the stand-by position is determined (step S61). When the carriage is at the stand-by position, the operation is completed. When it is determined that the document state has changed during the read operation, the process flows to step S61.

Namely, the operation for monitoring information sent from the size sensor 20 is started when the pressurizing plate 22 is open. The document state is determined to have been subjected to change when a signal output from the size sensor 20 changes even slightly. When the document state changes, the lamp 2 remains ON.

As described above, the scanning operation is started when the start key 114 of the operating section 110 is pressed. Then setting for scanning the document is executed and the lamp 2 is turned ON. Then the carriage starts moving. When the carriage reaches the read start position, a signal input operation starts. When the carriage reaches the read end position, a signal input operation ends and the lamp 2 is turned OFF. The scanning operation is completed after the carriage reaches the stand-by position.

Figure 15:
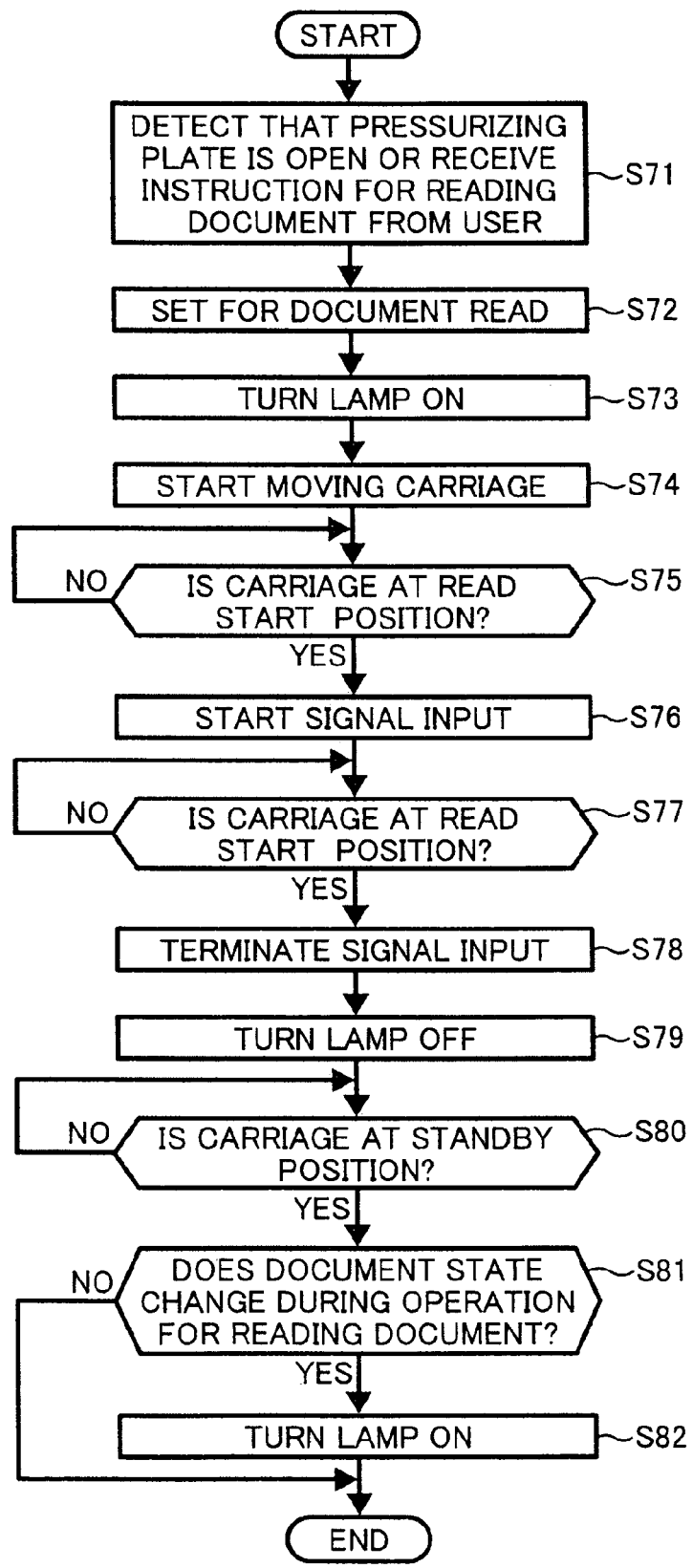
FIG. 15 is a flowchart for explaining another example of actions performed during the document read process.

A second example of operations in the embodiment of the present invention is described below with reference to FIG. 15. Like in the first example of operations described above, when the pressurizing plate open/closed sensor 21 detects that the pressurizing plate 22 is open, or when an instruction for reading the document sent when the start key 114 provided at the operating section 110 is pressed is received (step S71), setting for reading the document is performed (step S72), and the lamp 2 is turned ON (step S73). Then the carriage starts moving (step S74), and whether the carriage is at the read start position is determined (step S75). In other words, whether the carriage is at the prespecified position is determined by the home position sensor 13. When it is determined that the carriage is at the read start position, input of a read signal is started (step S76), and whether the carriage is at the read end position is determined (step S77). When the carriage is at the read end position, the signal input is terminated (step S78). Then, the lamp 2 is turned OFF (step S79), and whether the carriage is at the stand-by position is determined (step S80). When the carriage is at the stand-by position, whether the document state has changed during the read operation is determined (step S81). When the document state has changed, the lamp 2 is turned ON (step S82), and the process is completed.

As described above with respect to FIG. 14, the scanning operation is started when the start key 114 of the operating section 110 is pressed. After setting for scanning the document is performed, the lamp 2 is turned ON and the carriage starts moving. When the carriage reaches the read start position, a signal input operation is started. When the carriage reaches the read end position, a signal input operation is terminated. When the document state does not changed in the sequence, the lamp 2 is turned OFF. When the document state changes, the lamp 2 remains on. The image reader is kept in the stand-by state until the carriage reaches the stand-by position. When the carriage reaches the stand-by position, the scanning operation is completed.

As described above with respect to FIG. 15, the scanning operation is started when the start key 114 of the operating section 110 is pressed. After setting for scanning the document is performed, the lamp 2 is turned ON and the carriage starts moving. When the carriage reaches the read start position, a signal input operation is started. When the carriage reaches the read end position, a signal input operation is terminated and the lamp 2 is turned OFF. The image reader is kept in the stand-by state until the carriage reaches the stand-by position. When the document state changes during this sequence, the lamp 2 is turned ON again and the scanning operation is completed.

Figure 16A:
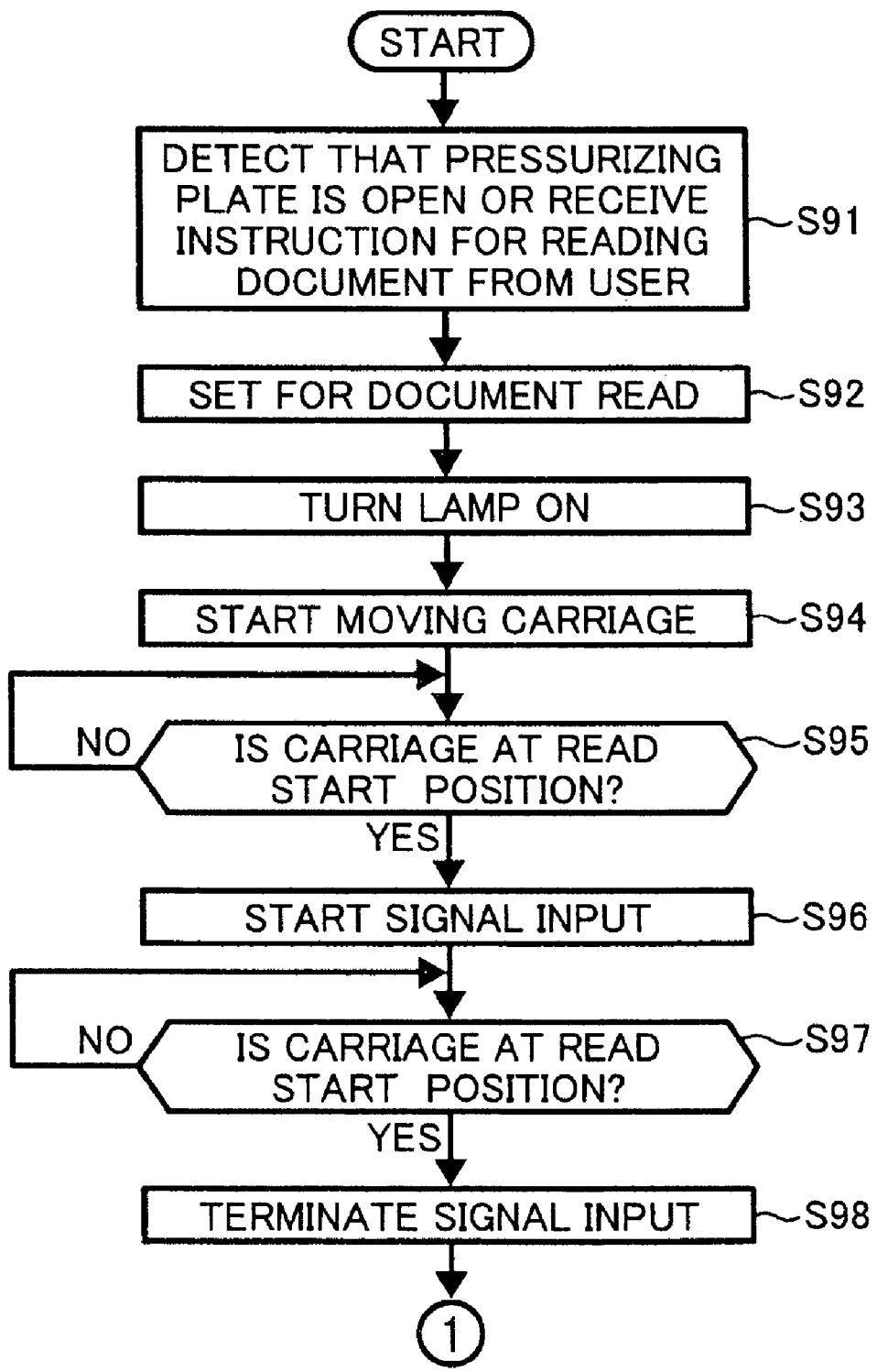
FIGS. 16A and 16B are flowcharts for explaining still another example of actions performed during the document read process.
Figure 16B:
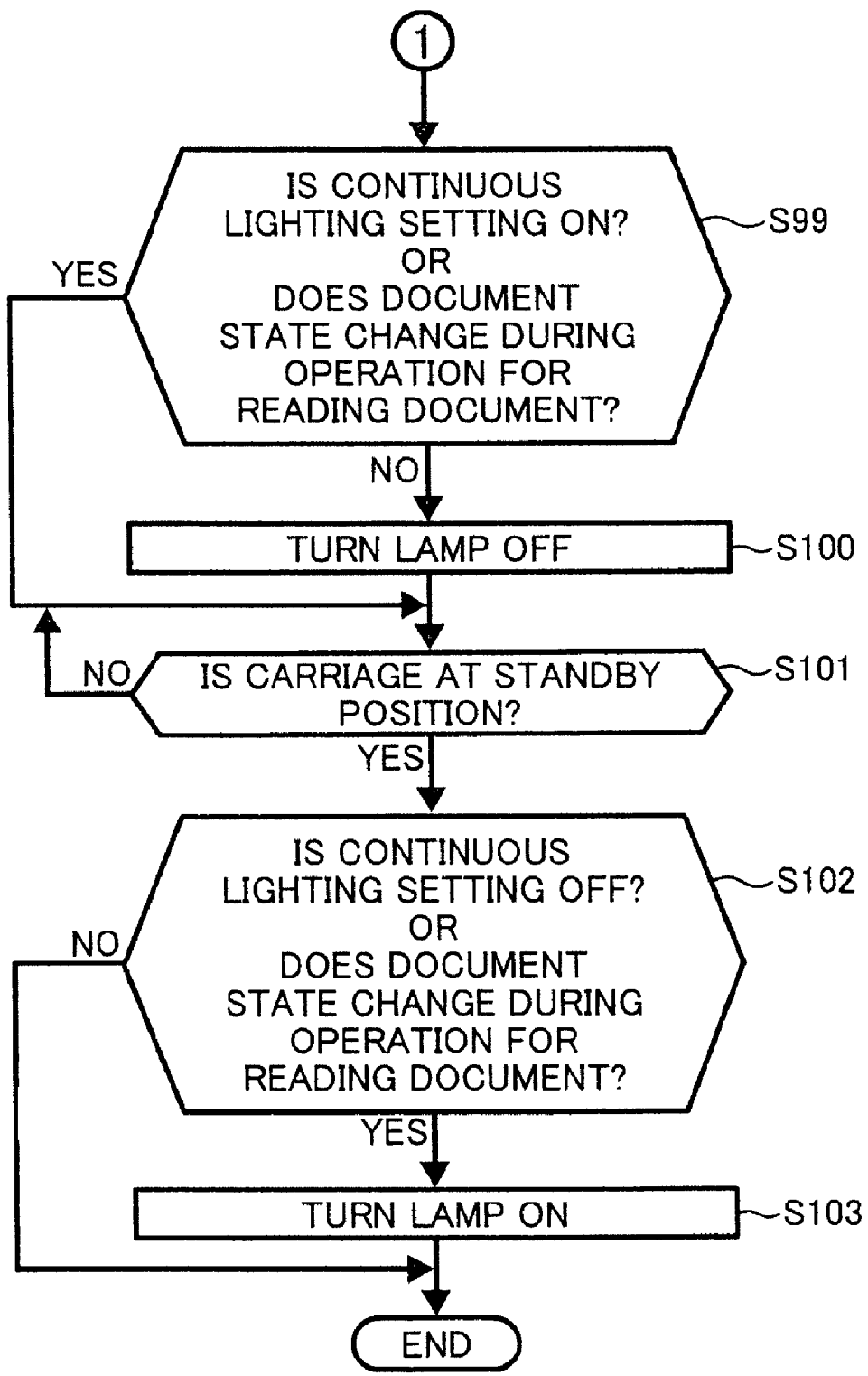

A third example of operations in the embodiment of the present invention is described below with reference to FIGS. 16A and 16B. Like in the first example of operations described above, when the pressurizing plate open/closed sensor 21 detects that the pressurizing plate 22 is open, or when an instruction for reading the document sent when the start key 114 provided at the operating section 110 is pressed is received (step S91), setting for reading the document is performed (step S92), and the lamp 2 is turned ON (step S93). Then, the carriage starts moving (step S94), and whether the carriage is at the read start position is determined (step S95). In other words, whether the carriage is at the prespecified position is determined by the home position sensor 13. When it is determined that the carriage is at the read start position, input of a read signal is started (step S96), and whether the carriage is at the read end position is determined (step S97). When the carriage is at the read end position, the signal input is terminated (step S98). Then, whether the continuous lighting setting is ON or OFF (the lamp continuous lighting switch 113 is turned ON or OFF), or whether the document state has changed during the operation for reading the document is determined (step S99). When the continuous lighting setting is OFF, or when the document state has not changed, the lamp 2 is turned OFF (step S100). When the continuous lighting setting is ON, or when the document state has changed, whether the carriage is at the stand-by position is determined (step S101). When the carriage is at the stand-by position, whether the continuous lighting setting is OFF (the lamp continuous lighting switch 113 is OFF), or whether the document state has changed during the operation for reading the document is determined (step S102). When the continuous lighting setting is OFF, or when the document state has changed, the lamp 2 is turned ON (step S103).

As described above, the user selects with the operating section 110 whether the lamp is to be kept ON when the document state changes during the operation for reading the document. The scanning operation is started when the start key 114 provided at the operating section 110 is pressed. After setting for scanning the document is performed, the lamp 2 is turned ON and the carriage starts moving. When the carriage reaches the read start position, signal input is started. When the carriage reaches the read end position, signal input is terminated. When the user selects that the lamp is not specified to be kept ON when the document state changes, the lamp 2 is turned OFF. When the user selects that the lamp is to be kept ON when the document state changes, and when the document state does not changed during the sequence, the lamp 2 is turned OFF with the image reader kept in the stand-by state until the carriage reaches the stand-by position. When the user selects that the lamp is not specified to be kept ON when the document state changes, and when the document state changes during the sequence, the lamp 2 is turned ON again and the scanning operation is completed.

An example for monitoring the document state in response to a change detected by the pressurizing plate open/closed sensor and controlling ON/OFF of the lamp 2 is described below.

FIG. 17 is a flowchart illustrating an operation in a second embodiment of the present invention. This operation is controlled and performed by the CPU 101. In FIG. 17, the CPU 101 determines whether the pressurizing plate 22 is open or not based on a signal output from the pressurizing plate open/closed sensor 21 (step S111). When the pressurizing plate 22 is determined as open, the lamp 2 starts lighting the document (step S112).

A change in the open/closed state of the pressurizing plate 22 or the ADF (not shown) is detected by monitoring the signal output from the pressurizing plate open/closed sensor 21. The pressurizing plate open/closed sensor 21 outputs an open signal (OFF signal) when the pressurizing plate 22 (or the ADF) is lifted at a prespecified angle or above, and outputs a close signal (ON signal) when the pressurizing plate 22 (or the ADF) is under the prespecified angle. The CPU 101 turns the lamp ON when receiving the open signal of the pressurizing plate 22 or the ADF.

The basic sequence concerning the operation for scanning the document in the second embodiment is similar to the sequence described in the flowcharts shown in FIG. 14. The overlapped description is omitted.

Also, when the image reader determines that the user may exchange the document during the operation for reading the document, the lamp 2 keeps ON even after the operation for reading the document is completed. The operation is described above with reference to the flowcharts shown in FIG. 15. Therefore, the overlapped description is omitted.

Next, an example of operation is described with reference to FIG. 18. In the example, when the image reader determines that the user may exchange the document during the operation for reading the document, the document lighting unit is turned OFF after the operation for reading the document is completed, and the document lighting unit is turned ON after the document scanning unit reaches the stand-by position.

Figure 18:
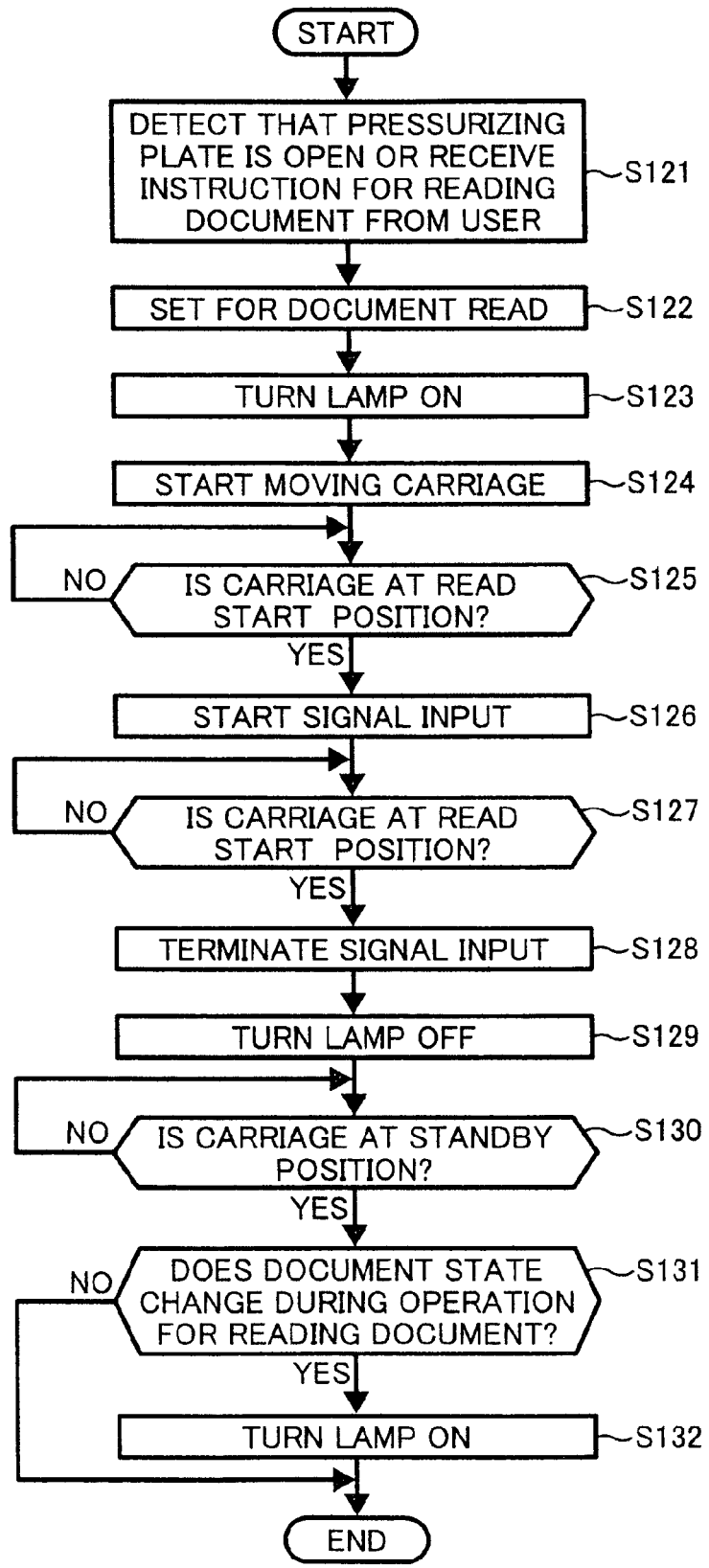
FIG. 18 is a flowchart for explaining operations performed by the image reader according to the second embodiment.

In FIG. 18, when the pressurizing plate open/closed sensor 21 detects that the pressurizing plate 22 is open, or when an instruction for reading the document sent when the start key 114 provided at the operating section 110 is pressed is received (step S121), setting for reading the document is performed (step S122), and the lamp 2 is turned ON (step S123). Then, the carriage starts moving (step S124), and whether the carriage is at the read start position is determined (step S125). In other words, whether the carriage is at the prespecified position is determined by the home position sensor 13. When it is determined that the carriage is at the read start position, input of a read signal is started (step S126), and whether the carriage is at the read end position is determined (step S127). When the carriage is at the read end position, the signal input is terminated (step S128). The lamp 2 is turned OFF (step S129) and whether the carriage is at the stand-by position is determined (step S130). When the carriage is at the stand-by position, whether the document state has changed during the operation for reading the document is determined (step S131). When the user selects that the lamp is not specified to be kept ON when the document state changes, or when the document state has changed, the lamp 2 is turned ON (step S132).

In the example, after setting for scanning the document is performed and the lamp 2 is turned ON, the carriage starts moving. Signal input is started when the carriage reaches the read start position, and the signal input is terminated when the carriage reaches the read end position. Then, the lamp 2 is turned OFF. The image reader is kept in the stand-by state until the carriage reaches the stand-by position. When the pressurizing plate open/closed sensor 21 keeps sending the open signal, or when the pressurizing plate 22 or the ADF has opened or closed during the sequence, the user may exchange the document. Therefore, the lamp 2 is turned ON again, and the scanning operation is completed.

Examples are described with reference to FIGS. 19A and 19B. In one example, the user can select, when the image reader determine that the user may exchange the document during the operation for reading the document, either that the lamp 2 is to be turned OFF after the operation for reading the document is completed and the lamp 2 is to be turned ON again and keep lighting after the document scanning unit reaches the stand-by position, or that the lamp 2 is to be kept ON after the operation for reading the document is completed. In the other example, the user can select with an external device, when the image reader determines that the user may exchange the document during the operation for reading the document, either that the lamp 2 is to be turned OFF after the operation for reading the document is completed and the lamp 2 is turned ON again and is to keep lighting after the document scanning unit reaches the stand-by position, or that the lamp 2 to be kept ON after the operation for reading the document is completed.

Figure 19A:
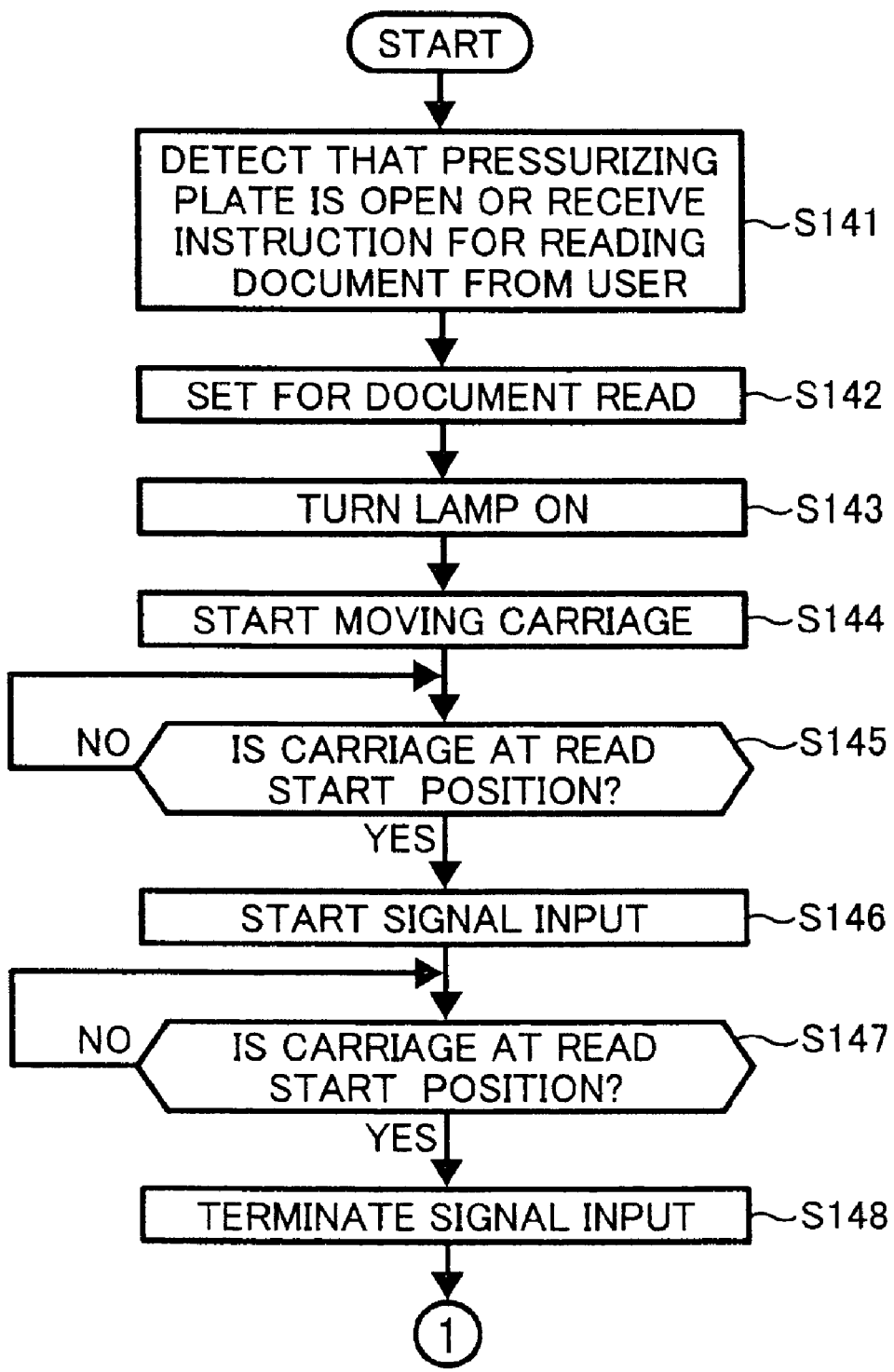
FIGS. 19A and 19B are flowcharts for explaining operation performed by the image reader according to the second embodiment.
Figure 19B:
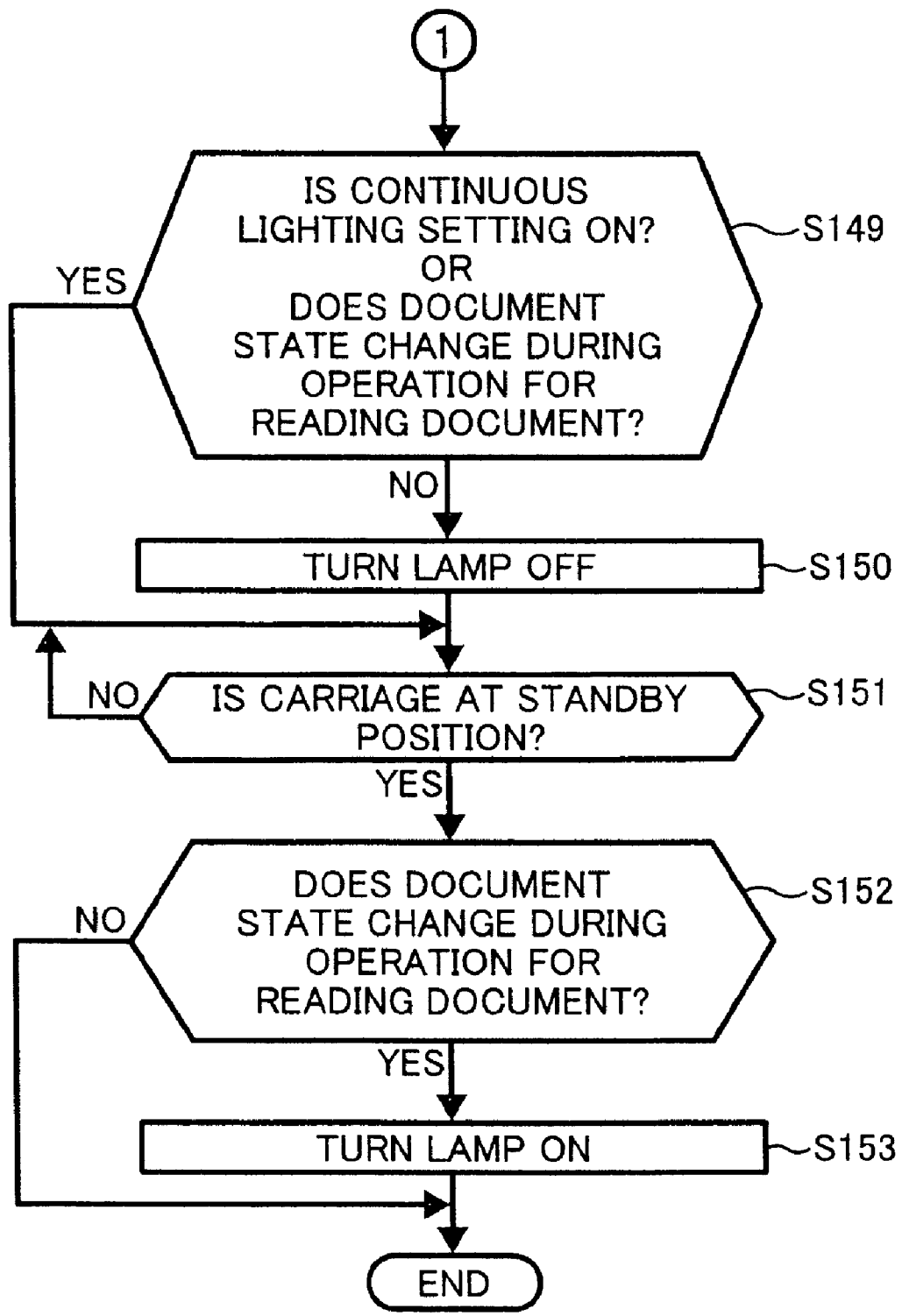

In FIGS. 19A and 19B, when the pressurizing plate open/closed sensor 21 detects that the pressurizing plate 22 is open, or when an instruction for reading the document sent when the start key 114 provided at the operating section 110 is pressed is received (step S141), setting for reading the document is performed (step S142), and the lamp 2 is turned ON (step S143). Then, the carriage starts moving (step S144), and whether the carriage is at the read start position is determined (step S145). In other words, whether the carriage is at the prespecified position is determined by the home position sensor 13. When it is determined that the carriage is at the read start position, input of a read signal is started (step S146), and whether the carriage is at the read end position is determined (step S147). When the carriage is at the read end position, the signal input is terminated (step S148). Then, whether the user selects that the lamp is to be kept ON when the document state changes (the lamp continuous lighting switch 113 is ON) and whether the document state has changed during the operation for reading the document are determined (step S149). When the user selects that the lamp is not specified to be kept ON when the document state changes, or when the document state does not change, the lamp 2 is turned OFF (step S150). When the user selects that the lamp is to be kept ON when the document state changes, or when the document state changes, whether the carriage is at the stand-by position is determined (step S151). When the carriage is at the stand-by position, whether the document state has changed during the operation for reading the document is determined (step S152). When the user selects that the lamp is not specified to be kept ON when the document state changes, or when the document state has changed, the lamp 2 is turned ON (step S153).

As described above, the user specifies with the operating section 110 whether the lamp is to be kept ON when an exchange of the document occurs during the scanning operation. The scanning operation is started when the start key 114 provided at the operating section 110 is pressed. After setting for scanning the document is performed, the lamp 2 is turned ON and the carriage starts moving. When the carriage reaches the read start position, signal input is started. When the carriage reaches the read end position, the signal input is terminated. Then, when the user selects that the lamp is not specified to be kept ON when an exchange of the document occurs, the lamp 2 is turned OFF. When the user selects that the lam is to be kept ON when an exchange of the document occurs, and when the pressurizing plate open/closed sensor 21 keeps sending the closed signal representing that a closing/opening motion does not occur while the sequence is performed, the lamp 2 is turned OFF. The image reader is kept in the stand-by state until the carriage reaches the stand-by position. Then when the pressurizing plate open/closed sensor 21 keeps sending the open signal or when at least one motion of closing/opening occurs, the user may exchange the document. Therefore, the lamp 2 is turned ON again and the scanning operation is completed.

The image reader according to an aspect of the present invention, when scanning a book-shaped document in the state where the pressurizing plate or the ADF is open with the book-shaped document being set on the contact glass, makes the document lighting unit start lighting before detecting the document size in the main scanning direction by monitoring a change in the document state and controlling ON/OFF of the document lighting unit. As a result, the image reader stabilizes the intensity of light from the document lighting unit within a shorter time, which enables reduction of a period of time for detecting the document size as well as prevention of miss-detection due to lack of the light from the lamp.

Moreover, when scanning a book-shaped document in the state where the pressurizing plate or the ADF is open with the book-shaped document set on the contact glass, makes the document lighting unit start lighting before detecting the document size in the main scanning direction by monitoring the document state with a change in a signal sent from the size sensor in the auxiliary scanning direction and controlling ON/OFF of the document lighting unit in response to the document state to be monitored. As a result, the image reader stabilizes the intensity of light from the document lighting unit within a shorter time, which enables reduction of a period of time for detecting the document size as well as prevention of miss-detection due to lack of the light from the lamp.

Furthermore, when the document state is changed during the operation for reading the document, employs a system in which the document lighting unit is kept lighting with the image reader waiting in the stand-by state after the operation for reading the document. As a result, the image reader stabilizes the intensity of light from the document lighting unit within a shorter time, which enables reducing a period of time for detecting the document size as well as prevention of miss-detection due to lack of the light from the lamp.

Furthermore, when the document state is changed during the operation for reading the document, employs a system in which the document lighting unit turns OFF after the operation for reading the document and turns ON again and is set in the stand-by state after the scanning unit reaches the stand-by position. As a result the image reader stabilizes the intensity of light from the document lighting unit within a shorter time, which enables reduction of a period of time for detecting the document size as well as prevention of miss-detection due to lack of the light from the lamp.

The image reader according to another aspect of the present invention provides a continuous lighting setting unit for setting whether the document lighting unit is kept lighting the document after the operation for reading the document is completed. With the continuous lighting setting unit, the image reader can detect the document size in a state where the intensity of light from the document lighting unit is stable. This results in preventing miss-detection due to lack of light.

Moreover, the image reader employs a system in which the lamp is kept lighting when an open/closed motion of the pressurizing plate occurs, namely the document is exchanged, because the image reader determines that the operation for detecting the document size is expected to be performed. As a result, the image reader reduces a period of stand-by time until the intensity of light from the lamp is stable enough to detect the document size. Also, the image reader reduces miss-detection due to lack of the light from the lamp, thus preventing miss-detection due to the lamp being OFF, because the lamp is kept lighting when the operation for detecting size starts.

Furthermore, the image reader employs a system in which the lamp is kept lighting when an open/closed motion of the pressurizing plate occurs during the operation for reading the document, which indicating the user may exchange the document and the operation for detecting size is expected to be performed. As a result, the image reader reduces a period of time until the intensity of light from the lamp is stable enough to start the operation for detecting size of the next document. Also, the image reader reduces miss-detection due to lack of the light from the lamp, thus preventing miss-detection due to the lamp being OFF, because the lamp is kept lighting when the operation for detecting size starts.

The image reader according to still another aspect of the present invention enables the lighting life of the lamp to be longer by saving unnecessary lighting. The image reader also provides the advantage of protecting the user's eyes from light when the document is not placed thereon.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reader, comprising:
   a lighting unit that irradiates a document, set on contact glass at a document read position, with light while the document is pressurized by a pressurizing plate so as not to move;
   a scanning unit that moves the lighting unit along the document to optically scan the document and acquire an optical signal indicative of an image of the document;
   an image reading unit that receives the optical signal from the scanning unit and prepares an entire image of the document; and
   a control unit configured to start monitoring changes in setting position of the document when the pressurizing plate is open and to control the lighting unit to irradiate the document with the light when a monitoring result indicates that the setting position of the document changes.

2. The image reader of claim 1, further comprising:
   a size sensor that detects a size of the document in an auxiliary scanning direction;
   wherein the control unit controls irradiation of the light by the lighting unit based on the size detected by the size sensor.

3. The image reader of claim 2, wherein when the size sensor detects that the size of the document has changed while the scanning unit is scanning the document, the control unit controls the lighting unit so as to irradiate the light when the lighting unit has returned to a normal position after completion of the scanning by the scanning unit.

4. The image reader of claim 2, wherein when the size sensor detects that the size of the document has changed while the scanning unit is scanning the document, the control unit controls the lighting unit so as to stop irradiation of the light, thereby terminating the scanning, and controls the lighting unit so as to irradiate the light when the lighting unit has returned to a normal position after the termination of the scanning.

5. The image reader of claim 2, further comprising a setting unit for setting whether the lighting unit is to continuously irradiate the light even after completion of the scanning by the scanning unit.

6. The image reader of claim 1, further comprising:
   a detecting unit that detects whether the pressurizing plate is open or closed;
   wherein the control unit controls the irradiation of the light by the lighting unit based on a result of the detection by the detecting unit.

7. The image reader of claim 6, wherein when the size sensor detects that the size of the document has changed while the scanning unit is scanning the document, the control unit controls the lighting unit so as to irradiate the light when the lighting unit has returned to a normal position after completion of the scanning by the scanning unit.

8. The image reader of claim 6, wherein when the size sensor detects that the size of the document has changed while the scanning unit is scanning the document, the control unit controls the lighting unit so as to stop irradiation of the light, thereby terminating the scanning, and controls the lighting unit so as to irradiate the light when the lighting unit has returned to a normal position after the termination of the scanning.

9. The image reader of claim 6, further comprising a setting unit for setting whether the lighting unit is to continuously irradiate the light even after completion of the scanning by the scanning unit.

10. The image reader of claim 9, wherein the setting unit is connected to and provided outside the image reader.

* * * * *